Jan. 18, 1938. McKINLEY PALMER 2,105,494
PISTON AND CYLINDER CONSTRUCTION
Filed Oct. 7, 1936
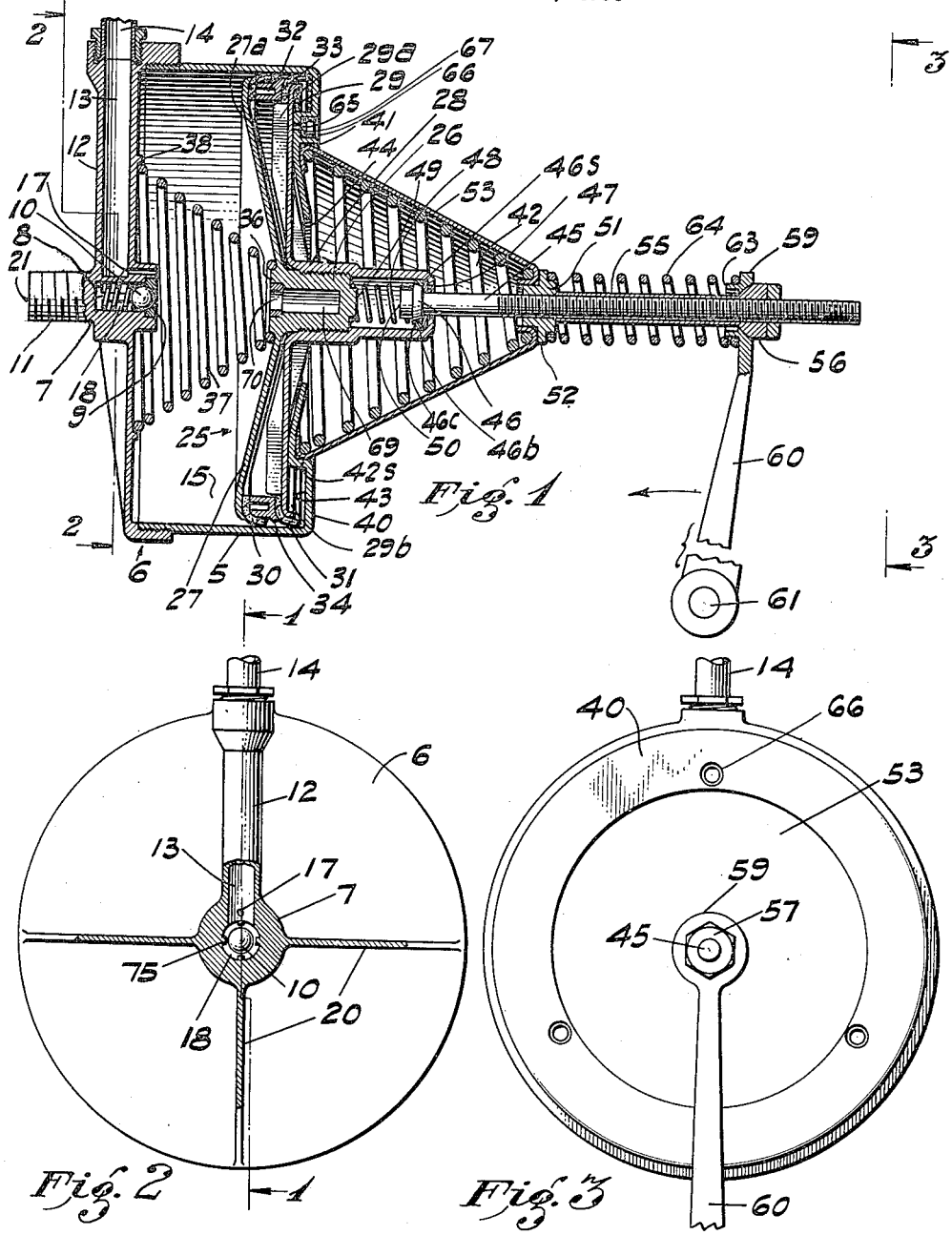
McKINLEY PALMER
INVENTOR.
BY ATTORNEY.

Patented Jan. 18, 1938

2,105,494

UNITED STATES PATENT OFFICE 2,105,494

PISTON AND CYLINDER CONSTRUCTION

McKinley Palmer, Beverly Hills, Calif.

Application October 7, 1936, Serial No. 104,499

4 Claims. (Cl. 121—38)

This invention relates in general to vacuum operated power means for operating the clutch mechanism of an automotive vehicle and in particular to the piston and cylinder construction per se disclosed in my Automatic clutch control Patent #2,050,729 issued August 11, 1936 and pending application for Vacuum operated device, Ser. No. 2,662, filed January 21, 1935.

My invention, though directed specifically to the piston and cylinder construction, as stated, nevertheless provides in addition improved means for more effectively controlling automatically the clutching and releasing operation of the motor with the driving shaft of the vehicle.

It is an important object of the invention to provide an improved piston and cylinder construction which may be used as a unit, conveniently mounted on a motor and be readily attached to the clutch shaft for accomplishing the purpose already set forth.

It is a further object of the invention to provide improved features of construction whereby the piston is permitted to perform its function with less resistance and wear and wherein the efficiency of the construction as a whole is increased.

Still another object of the invention is to provide an improved clutch releasing mechanism whereby the released clutch is automatically retracted sufficiently to provide a safety clearance between itself and the throw-out bearing so that vibration and weakening of springs will cause any intermittent wearing contact.

Still other objects of the invention are: to reduce the amount of space required for retraction and expansion of the springs which control the operation of the clutch thereby shortening the piston and cylinder construction and adapting the device for being installed in a smaller space and at a lowered cost of manufacture; to furnish an improved means to keep dust and dirt from entering working parts of the device; to improve upon the air seal construction of the piston and adapt this construction for the more effective use of lubricating and air-sealing oils in conjunction therewith; to provide an improved dash-pot or air control for the piston; and to furnish an improved operating connection between an operating lever, the free end of which swings thru an arc, and the piston rod or reciprocatory member whereby the head of the piston is actuated.

Other objects, advantages and features of invention will hereinafter appear.

Referring to the accompanying drawing, which illustrates what is at present deemed to be one of the preferred embodiments of the invention:

Fig. 1 is a longitudinal section thru the piston cylinder on line 1—1 of Fig. 2.

Fig. 2 is a vertical cross section on line 2—2 of Fig. 1.

Fig. 3 is an elevation looking at the right hand end of the structure shown in Fig. 1.

Referring in detail to the drawing, the drum shaped piston cylinder 5 screws into a cap 6 which closes its otherwise open side. Said cap has a thickened hub or central portion 7 within which is a valve chamber 8 bored thereinto from the inner side of the cap, an annular valve seat member 9 being driven into the expanded mouth portion of this bore after the ball check valve 10 and its compression spring 11 have been put in place.

A tubular rise 12 extends radially from the hub or central part 7 to the periphery of the tub 6, at which point the passage 13 within said rise communicates with a pipe 14 which leads, for example, to the manifold of an internal combustion engine. Said passage communicates with the piston chamber 15 through a restricted passage or duct 17, and one or more restricted valve chamber ducts 18 afford communication between passage 13 and valve chamber 8.

Three radial reinforcing ribs 20 cooperate with the tubular rise 12 to strengthen the piston cylinder head 6. Projecting from the outer face of said head is an externally screw threaded stub shaft 21 which serves to attach the device to any suitable support, for example, to a bracket carried by an engine structure.

A composite piston head 25 has a working fit within the piston cylinder 5. Said head comprises a central externally screw threaded hub 26 which carries at its inner end a broadly conical disk 27, there being a narrow annular clearance between the periphery of said disk and the inner surface of the piston cylinder.

A thimble 28 is provided which is internally screw threaded for about half its length adjacent to its open inner end, and into said thimble is screwed said hub 26. The inner end of said thimble carries a disk or radial flange 29 of about the same diameter as the disk 25.

Between the peripheral portions of the disks 27 and 29 are placed the fabric packing rings or cup washers 30 and 31, said rings being held in place in part by a spacer ring 33 disposed between them. As viewed in cross section said spacer ring is of a hollow rectangular character. It is open at one side and closed at the opposite side, the outer side having a curved, outwardly directed curved peripheral flange 34 which aids in clamping the packing ring 31 in place. The other packing ring 30 is clamped between the peripheral portion of disk 27 and the open side of ring 33. Said ring is thus furnished with an oil groove 32.

The inner end of hub 26 has a small annular rise 36 around which is seated the small end of helical spring 37, the large end of said spring abutting against the inner face of head 6, said head having an annular bead 38 to hold the large end of said spring in place.

As viewed in Fig. 1, the right hand side of the drum shaped piston cylinder 5 is partly closed by an internally projecting peripheral flange 40, the central portion of which is annularly depressed at 41 to afford a seat for the large end of the outer helical spring 42. From said depression 41 there results an annular shoulder 42s within which the large end of spring 42 fits, and an internal annular recess 43 around said shoulder. Thru the central portion of flange 40 is a circular central opening 44.

There is a central opening through the bottom of thimble 28 (its right hand end as viewed in Fig. 1) and through said opening projects one end portion of the operating rod 45 of the piston, said rod having a head 46 which, after assembling, keeps it from being withdrawn from the thimble. A packing ring 47 prevents leakage around rod 45 thru the aperture which admits said rod to the thimble. A case hardened bearing ring 46b is fitted within the outer end portion of the thimble 28. The outer face of said ring abuts against a step 46s provided therefor, and around the opening through said ring is an arcuate bearing bevel 46c which cooperates with a similarly beveled bearing surface around head 46.

Within the thimble 28 is a compression spring 48 which opposes movement of rod 45 into said thimble. One end of said spring is fitted around the hub rise 49 and the opposite end thereof is fitted around a reduced part 50 of head 46.

The rod 45 is extensively screw threaded and has adjustably screwed thereonto a collar 51 furnished with a peripheral rib 52. The small end of the outer helical spring 42 abuts against the inner side of this rib. This spring is enveloped by a boot 53 preferably made of sheet rubber to give it both flexibility and elasticity. Said boot is conical in shape to fit telescopically around spring 42. Its large end is tucked under the large end of said spring and its small end under the small end thereof, as shown. Said boot forms an efficient dust guard to protect the working parts within the piston chamber from injurious extraneous substances.

The spring 42 not only prevents said boot from injury that might result from its folds being caught between moving parts, but said spring also assists in returning the piston to its normal position.

Outwardly beyond the collar 51 a sleeve 55 is screwed on to the rod 45. Said sleeve has a head 56 at its outer end which is hexagon shaped whereby the sleeve may be locked against the outer face of collar 51. The inner side of said head is convexed, and therewith cooperates the annular outer end portion 59 of the clutch-operating arm 60. The opening through the annular part 59 is dished or beveled in such a way as to form in conjunction with the head 56 similarly arcuated, cooperating bearing surfaces, in order that, as the arm 60 swings together with the clutch-operating rock shaft 61 (to which it is in fixed relation) correctly matching bearing surfaces will be maintained.

On its inner side the annulus 59 has a spring mounting flange 63 around which is fitted the outer end of a compression cushioning spring 64 the opposite end of said spring being fitted around the collar 51 and abutting against the flange 52 thereof. This spring is provided to cause a complete outward swing of the arm 60, thereby insuring that the clutch controlled thereby is completely released.

Describing certain details of construction, the piston head disk 27 is furnished with radial ribs 27a, the outer ends of which are in spaced relation to the periphery of said disk and against these abuts the inner edge of the packing ring 30. Hence these ribs perform the double function of reinforcing the disk of which they form a part and of aiding in keeping said packing ring in place.

The piston head disk 29 has somewhat similar ribs or flanges 29a which reinforce it and aid in keeping the packing ring 31 in piece. This disk also has a narrow outwardly (to the left as viewed in Fig. 1) directed flange 29b over which the packing ring 31 is deflected.

The construction of the piston shell 5 and of its cap 6 is such that, in whatever position the device may be supported, upstanding inclined or horizontal, a considerable quantity of lubricating oil may be retained within the piston chamber without leaking out. With regard to said cap, this is due to the fact that the internal portion of its hub 6 projects into the piston chamber thus preventing oil from escaping from the opening in the center thereof, even when the ball valve 10 is open. At the opposite side of the piston head the annular recess 43 will keep oil from escaping thru the central opening 44 even if the device be placed in an upstanding position.

In addition to the ports and passages which have been mentioned, there are provided a plurality of relief vents or bleed apertures 65 which are located in the bottoms of recesses 66 formed in the outer side of the end wall or flange 40 of the piston cylinder 5. These vents prevent atmospheric pressure from interfering with the movements of the piston head.

Entrance of dust thru said vents 65 is prevented by felt washers 67 which are held in place by rings fitted within said recesses 66 in a friction tight manner.

The hollow hub 26 of the inner piston disk 27 has the bore 69 thereof provided at its open end with a polygonal enlargement 70 to be engaged by a suitable tool for screwing said hub into or unscrewing it from the assembled position.

In order to permit fluid to enter the cylindrical chamber guarded by the ball valve 10 when said valve is unseated, a plurality of internal longitudinal ribs 75 (see Fig. 2) are formed within said chamber, the ribs also guiding the ball 10 during its opening and closing movements.

The operation of the piston and piston cylinder construction of this application has been disclosed in my co-pending application of even date drawn to a clutch-controlling valve mechanism per se, and will only be repeated here insofar as it is requisite to a proper understanding of the operation of the piston and cylinder construction set forth in the present disclosure.

When suction is produced in the passage 13, the piston is caused to move from the end of the cylinder in which it is shown in Fig. 1 to the opposite end thereof, effecting the operation of the following parts: Ball 10 is retracted compressing spring 11 permitting air to pass thru ducts 18 into passage 13. As the piston moves forwardly it carries with it the adjustable connecting rod 45 compressing helical springs 37 and 42 and contracting boot 53. As soon as the piston starts moving there is created a direct pull of the thimble 28 against the piston rod head 46, and this causes the rib 52 to press against spring 42 and simultaneously causes head 56 of sleeves 55 to press against the free end portion of clutch arm 60. Hence as the piston is actuated the clutch arm 60 is simultaneously actuated. Arm 60 may also be moved forwardly by compressing the spring tension directed thereagainst, without effecting movement of other parts. As the piston is moved forwardly air is entrained into the cylinder in rear of the piston. Check valve comprising ball 10 and spring 11 provides for rapid escape of air from the piston cylinder and aperture 17 provides for gradual flow of air into said cylinder. Connecting rod 45 is adjustable so as to reciprocate in a longitudinal direction axially of the cylinder. In the present disclosure rod 45, having a straight pull in one direction as a result of suction, is linked up with an arm which has a curvilinear motion. By virtue of the clearance between the flange 63 and shaft 45 and the arcuated seat of parts 59 and 56 providing a ball and socket joint, the slight rocking of part 60 will not interfere with the straight line reciprocation of the rod 45. This construction also enables perfect alinement of piston rod and clutch lever to be maintained at all times. However, the flexing of the flanges of packing rings 30 and 31 permits of a lateral swing of the end of rod 45. Also, the ball joint between the head 46 and ring 46b further provides for lateral adjustment of the headed end of rod 45 together with thimble 28 with which it cooperates.

This invention pertains to a piston and cylinder employing suction to operate the clutch of an automobile. This is one of the many uses to which said invention may be put, and altho it has been described in conjunction with the clutch of an automobile, it is however adapted for still other uses and is to be limited only to the extent stated in the appended claims.

What is claimed is:

1. A piston construction including a piston rod having a head at one end, a piston head furnished with hollow hub construction having an aperture leading thereinto smaller than said rod head and containing the headed portion of said rod, a compression spring within said hollow hub and engaging the headed portion of said rod to move it outwardly, additional springs cooperating to move said rod in the same direction as the first recited spring, and a piston cylinder construction with which the piston cooperates and upon which said additional springs abut.

2. In a device of the kind described, a piston cylinder, a double piston head therein, one part of said head having a thimble-like hub which projects outwardly thru the central portion of one of the end walls of said piston cylinder and the other part of said double head having a hub which is secured within the open end portion of said thimble-like hub, the latter hub having an aperture in its outer end, a piston rod extending loosely thru said aperture, said rod having a head within the thimble of a greater diameter than said aperture, a compression spring within the thimble, one end of said spring pressing against the headed portion of said rod, a collar secured to said rod in an outwardly spaced relation to said head, and a compression spring having one end abutting against said collar and its opposite end abutting against the adjacent end of said piston cylinder.

3. In a device of the kind described, a piston cylinder having a central opening in one of its ends a piston for said cylinder having a rod which is operatively connected with said piston, a sleeve screwed on to said rod, said sleeve having a collar around it which is furnished with an annular arcuate bearing surface, and a pivotally mounted swingable arm provided at its free end with an annular arcuate bearing surface in a cooperative relation to the first recited bearing surface, said piston cylinder having a port through which suction may be applied to said piston, and spring means mounted upon the device and tending to move said piston outwardly in opposition to suction applied as aforesaid to said piston.

4. A device as set forth comprising a cylinder having one of its ends externally annularly depressed, a piston in said cylinder having a thimble extending thru an opening in said end, a rod having a head provided with a ball and socket joint in said thimble, a nut having a flange screwed on the end of said rod in spaced relation to said thimble, a helical spring interposed between said end and nut and within the limitations described by said depression and flange, and a conical elastic boot open at both ends and each end having portions tucked beneath the opposite end portions of said helical spring, the smaller end of said boot being telescopic along with the smaller end of said spring into the larger portion thereof.

McKINLEY PALMER.